United States Patent [19]

Uetsuki et al.

[11] Patent Number: 4,722,492

[45] Date of Patent: Feb. 2, 1988

[54] MAGNETIC BRAKE FOR A FISHING REEL

[75] Inventors: Haruo Uetsuki; Takehiro Kobayashi, both of Hiroshima, Japan

[73] Assignee: Ryobi Ltd., Tokyo, Japan

[21] Appl. No.: 4,855

[22] Filed: Jan. 12, 1987

Related U.S. Application Data

[63] Continuation of Ser. No. 823,965, Jan. 29, abandoned, which is a continuation of Ser. No. 545,863, Oct. 27, 1983, abandoned.

[30] Foreign Application Priority Data

Nov. 1, 1982 [JP] Japan ............................ 57-166740[U]
Nov. 1, 1982 [JP] Japan ............................ 57-166741[U]

[51] Int. Cl.$^4$ ............................................. A01K 89/02
[52] U.S. Cl. .................................. 242/84.52 B; 310/93
[58] Field of Search ................ 242/84.51 R, 84.52 R, 242/84.52 A, 84.52 B; 310/93, 105

[56] References Cited

U.S. PATENT DOCUMENTS

| 2,361,239 | 10/1944 | Ransom | 242/84.52 B |
| 2,465,932 | 3/1949 | Romine | 242/84.52 B |
| 3,123,319 | 3/1964 | Hull | 242/84.51 A |
| 4,434,951 | 3/1984 | Nakajima | 242/84.52 B |

FOREIGN PATENT DOCUMENTS

| 57-31175 | 2/1982 | Japan . | |
| 635116 | 4/1950 | United Kingdom | 242/84.52 B |

*Primary Examiner*—Billy S. Taylor
*Attorney, Agent, or Firm*—Finnegan, Henderson, Farabow, Garret and Dunner

[57] ABSTRACT

A device for preventing fishing line backlash in a double-bearing type fishing reel wherein a spool is loaded by magnetic induction to prevent the backlash. The device is so constructed that magnet rings are located inside and outside of an electric conductive ring fixed to a spool shaft. One of the magnetic rings is rotated by an adjusting disc having a guide slot to engage a lug on the rotated ring to adjust the magnetic induction brake force for the spool.

2 Claims, 3 Drawing Figures

MAGNETIC BRAKE FOR A FISHING REEL

This application is a continuation of application Ser. No. 823,965, filed Jan. 29, 1986 which was a continuation of application Ser. No. 545,863 filed Oct. 27, 1983, both now abandoned.

FIELD OF THE INVENTION

The present invention relates to a device for preventing fishing line backlash in a double-bearing type fishing reel wherein a spool is loaded by magnetic induction to prevent fishing line backlash.

BACKGROUND OF THE INVENTION

Devices are known for preventing fishing line backlash through the use of magnets. These devices have experienced problems, and as a result, have not been widely adopted. Such a device is constructed by locating magnets near the inner and outer surfaces of an electrically conductive ring. The ring is fixed to a spool shaft, and the displacement of magnetic poles by rotation of one of the magnets controls the magnetic field to adjust the brake force of the spool. Both magnet rings rotate with the spool and must be attached with prescribed clearances.

In such devices for preventing backlash, the rotation angles of the magnets are large when compared with the rotation angle of an adjustment lever. This has made it difficult to adjust the magnetic field accurately, and has caused the brake force to be difficult to control.

OBJECTS AND SUMMARY OF THE INVENTION

Having regard to the above-mentioned problems, an object of the present invention is a simple fitting structure for both the magnet rings and the spool shaft within a fishing line backlash prevention device.

Another object of this invention is a device for preventing fishing line backlash in a double-bearing type fishing reel in which the rotation angles of the magnets are precisely controllable.

Still another object is a fishing line backlash prevention device of simple and inexpensive construction.

These and other objects are accomplished by a device for preventing fishing line backlash in a fishing reel comprising a spool rotatably mounted in the reel, an electrically conductive ring concentrically attached to the spool to be rotatable therewith, and means for variably loading the conductive ring with a magnetic field to selectively brake rotation of the spool.

In a more specific manner the objects mentioned above can be attained according to the present invention by a device for preventing fishing line backlash in a double-bearing type fishing reel wherein outer and inner magnetic rings are fitted in two concave dents formed concentrically in an outer plate of the reel body. The outer and inner magnetic rings are disposed opposite respective outer and inner surfaces of an electrically conductive ring fixed concentrically therewith to the spool shaft. The magnetic rings are constructed such that they are rotatively adjusted by a cam groove of an adjustment lever with the rotation angles of the magnetic rings being small compared with the rotation angle of the adjustment lever. The magnetic field produced by the magnetic rings is controlled to brake the spool and thereby prevent fishing line backlash.

BRIEF DESCRIPTION OF THE DRAWINGS

These and other objects, features, and advantages of the invention, as well as the invention itself, will become more apparent to those skilled in the art when considered in the light of the accompanying drawings wherein.

DETAILED DESCRIPTION OF THE PREFERRED EMBODIMENT

Figure 1:
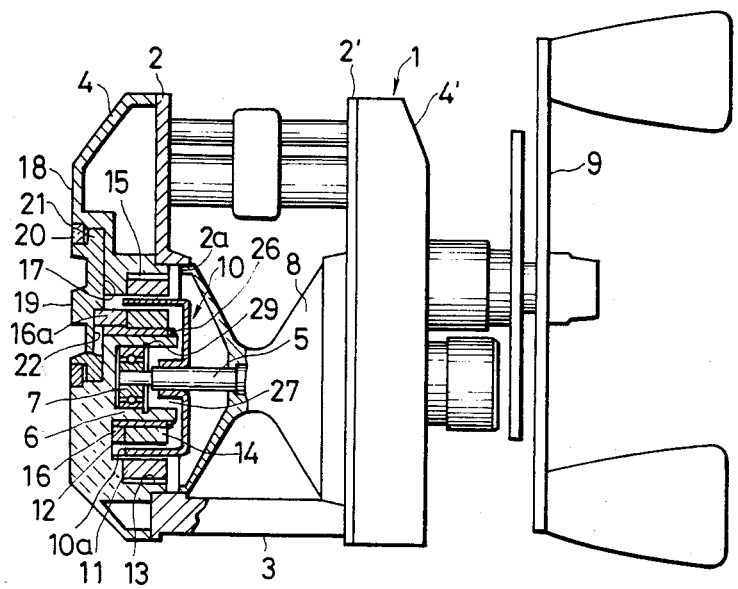
FIG. 1 is a partial cross sectional front view of a double-bearing type fishing reel with a device for preventing backlash according to the present invention.

A reel body 1 is formed of right and left side plates 2, 2' separated by a prescribed distance by a cross shaft 3. Outer side plates 4, 4' are fixed with screws to the side plates 2, 2'.

Circular holes 2a are oppositely opened in the side plates 2, 2' to receive the ends of the spool shaft 5 for rotation therein. As for the inner surfaces of the outer side plates 4, 4', fitting dents 27 for bearing members 7 and annular-shaped fitting dents 13 for an outer magnetic ring 11 and an inner magnetic ring 12 (described below) are formed concentrically with the circular holes 2a. The bearing members 7 are fitted into the fitting dents 27 and are attached thereto with stop rings 29 to prevent separation. The spool shaft 5 to which a spool 8 and an electrically conductive ring 10 are fixed is rotatively supported by the bearing members 7 so that the spool 8 is disposed between the side plates 2.2'.

Figure 2:
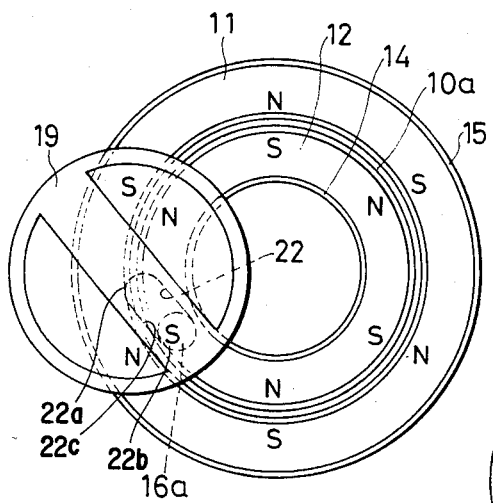
FIG. 2 and FIG. 3 are diagrams which illustrate the present invention for preventing backlash with the maximum brake force and with the minimum brake force, respectively.
Figure 3:
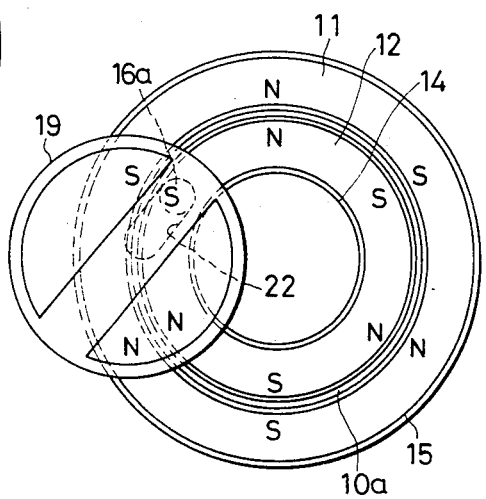

The device further includes means for variably loading the electrically conductive ring 10 with a magnetic field to selectively brake rotation of the spool 8. As embodied herein, the loading means comprises the outer magnetic ring 11 and the inner magnetic ring 12 which are secured by annular yokes 14, 15. At least one of the magnetic rings 11, 12, the inner magnet ring 12 in case of the embodiment shown in FIGS. 1-3, is rotatable. Prescribed clearances between the magnetic rings 11, 12 and the inner and outer surfaces of the annular wall 10a of the electrically conductive ring 10 are maintained.

The outer magnetic ring 11 is preferably fixed in its associated fitting dent 13, while the inner magnetic ring 12 is rotatable within its associated fitting dent 13. A stop ring 26 is preferably fitted into the circular edge of the opening of the fitting dent 13 to prevent separation of the inner magnetic ring 12.

The inner magnetic ring 12 is connected to an attachment 16. A projection 16a formed on the attachment 16 projects outwardly through a window 17 in the outer side plate 4. The projection 16a is received and guided rotatably by a cam groove or guide slot 22 which is formed in the shape of straight line in a radial direction at the inside of an adjustment lever 19 formed by depressions in a disc. The adjustment disc with the lever 19 is inserted into an indentation 18 formed outside of the outer side plate 4 and is operated rotatively.

The inner magnetic ring 12 is rotated together with the attachment 16 by the cam groove 22 when the adjustment lever 19 is rotated. The magnetic poles of both magnetic rings 11, 12 comprising alternating areas of a first polarity and of a second polarlity, are relatively displaced to control the strength of the magnetic field produced thereby so that the brake force of the spool 8 is variable.

A ring member 21 is fixed by a spring washer 20 in the opening part of the dent 18 so that the adjustment lever 19 is prevented from separating. A handle 9 is supported by the other outer side plate 4'. The shaft of the handle 9 is operatively connected to the spool shaft 5 through a gear transmission (not shown).

At the inside of the adjustment lever 19, the cam groove 22 is formed in the shape of an elongated straight line having an inner portion 22a proximate the axis of the disc, an outer portion 22b nearest the periphery of the disc, and an intermediate portion 22c between the inner and outer portions 22a, 22b. The projection 16a of the attachment 16 is slidably fitted within the similarly sized portions 22a-c of the cam groove 22. Movement of the projection 16a within the inner and outer portions 22a, 22b provides abrupt changes in the degree of rotation of the rotative ring, whereas rotation of the projection 16b within the intermediate portion 22c provides only a gradual change in the degree of rotation of the inner magnetic ring 12, thereby enabling more precise control of the magnetic forces when the projection is within the intermediate portion 22c.

The cam groove 22 is formed radially from its center as shown in FIG. 2 and FIG. 3. The adjustment lever 19 is located in the dent 18 of the outer side plate 4. Rotation of the adjustment lever 19 rotatively guides the projection 16a within the cam groove 22. The magnetic rings 11, 12, in which north poles and south poles are arranged circumferentially at regular intervals as shown in FIG. 2 and FIG. 3, are used as the outer magnetic ring 11 and inner magnetic ring 12.

In this preferred embodiment, rotation of the adjustment lever 19 causes the projection 16a to be guided along the cam groove 22 and to be moved circumferentially. The projection 16a and the inner magnetic ring 12 are connected together or integrally formed and thus rotate together.

The inner magnetic ring 12 is selectively rotated as a result of rotating the adjustment lever 19 in the normal or the reverse direction. When the adjustment lever 19 is operated so that opposite magnetic poles of the outer and inner magnetic rings 11, 12 are opposite each other, as shown in FIG. 2, the brake force on the spool 8 is at its maximum. Conversely, when the like magnetic poles are positioned opposite each other, as shown in FIG. 3, the brake force on the spool 8 is at its minimum. Therefore, the brake force is freely adjustable between the maximum and minimum values by movement of the adjustment lever 19.

Although as described with respect to the preferred embodiment, the inner magnetic ring 12 is rotatable, it is clearly within the scope of the invention to mount the outer magnetic ring 11 so that it is rotatable and the inner magnetic ring 12 is stationary.

As mentioned above, in the device of the present invention, the outer magnetic ring 11 and the inner magnetic ring 12 are respectively located opposite inner and outer surfaces of the electrically conductive ring 10. The electrically conductive ring 10 is fixed to the spool shaft 5 so that a magnetic load is imposed across the spool 8 by induction. The fitting dents 13 for the outer magnetic ring 11 and the inner magnetic ring 12 and the fitting dents 27 for the bearing members 7 of the spool shaft 5 are formed concentrically in the outer side plate 4 of the reel body 1 so that the magnetic rings 11, 12 and bearing members 7 are also concentric when fitted in their respective fitting dents.

The contruction of the present invention makes it possible to keep the clearances constant between the electrically conductive ring 10 fixed to the spool shaft 5 and the magnetic rings 11, 12, and to assemble the device simply and easily and with high accuracy. Because it is possible to simplify the construction of this type of device for preventing backlash, productivity is raised and it is possible to supply the devices at relatively low prices.

Since the clearances between the electrically conductive ring 10 and the outer and inner magnetic rings 11, 12 are kept constant, it is possible to generate the magnetic field uniformly and to ensure the precise adjustment of the brake force of the spool by displacement of the magnetic poles.

While the salient features of the invention have been described with the reference to the drawing, it should be understood that the embodiment is susceptible of modification without departing from the spirit and scope of the following claims.

What is claimed is:

1. A magnetic brake for a fishing reel comprising:
   a housing:
   a fishing line spool rotatably mounted within said housing:
   an outer cover secured to said housing about the axis of said spool;
   a pair of concentric rings of magnetic material fitted in said cover and concentric with the axis of said spool;
   means for mounting one of said rings for rotative movement with respect to the other, each of said rings being segmentally magnetized along the circumferences thereof to present spaced north and south poles to like poles on the other ring;
   an electrically conductive drag sleeve positioned in between said concentric rings and concentrically attached to said spool to be rotatable therewith, the distances between said drag sleeve and each of said rings being essentially constant throughout rotation of said ring;
   a lug projecting from said rotative ring;
   an adjusting disc rotatably mounted on said cover with the axis of the disc being offset with respect to the axis of the spool; and
   said disc having a radially extending finite guide slot for slidably receiving and rotating said lug to rotate said rotative ring to move the magnetic poles thereon relative to the magnetic poles on the other ring to vary the magnetic forces extending between the magnetic poles on the respective rings and the magnetic effect on said drag sleeve, said guide slot being substantially linear and defining an inner portion proximate the axis of said disc, an outer portion nearest the periphery of said disc, and an intermediate portion between said inner and said outer portions, said slot portions being similarly sized, wherein movement of said lug within said inner and said outer portions provides abrupt changes in the degree of rotation of said rotative ring, while rotation of said lug within said intermediate portion provides only a gradual change in the degree of rotation of said rotative ring to enable more precise control of the magnetic forces extending between said pair of concentric rings when the lug is within said intermediate portion.

2. A magnetic brake for a fishing reel as defined in claim 1 wherein said outer cover is provided with an indentation for receiving and rotatably mounting said disc.

* * * * *